Figure 1:
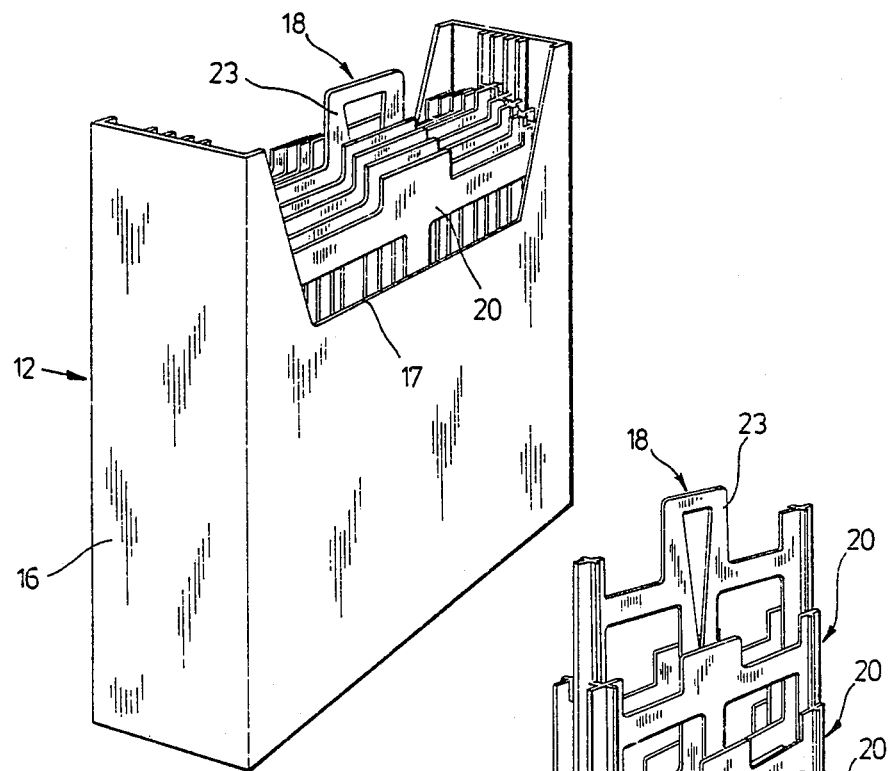

United States Patent [19]

Shearing et al.

[11] 4,387,802

[45] Jun. 14, 1983

[54] CONTAINER FOR THIN FLAT ARTICLES

[76] Inventors: Scott J. G. Shearing, 16 Waterfield Dr., Scarborough, Ontario, Canada, M1P 3W5; Ronald R. Bache, 14 Queensdale Ave., Toronto, Ontario, Canada, M4J 1X9

[21] Appl. No.: 286,329

[22] Filed: Jul. 24, 1981

[51] Int. Cl.$^3$ .............................................. B65D 5/50
[52] U.S. Cl. ...................................... 206/45; 206/444; 206/309; 312/320; 211/41
[58] Field of Search ..................... 206/45, 45.11, 307, 206/309, 311, 312, 391, 393, 444, 445, 454, 455, 456, 804, 45.14, 387; 220/4 A, 4 C, 8; 190/17, 21, 22, 30, 33, 34; 211/40, 41; 312/8, 205, 320, 244

[56] References Cited

U.S. PATENT DOCUMENTS

| | | | |
|---|---|---|---|
| 490,156 | 1/1893 | Miller | 206/45 |
| 839,438 | 12/1906 | Turner, Jr. | 206/45 |
| 886,066 | 4/1908 | Obertrifter | 206/45 |
| 922,498 | 5/1909 | Merritt | 206/45 |
| 939,807 | 11/1909 | Collins | 206/45 |
| 1,019,850 | 3/1912 | Shutes | 190/17 |
| 2,720,438 | 10/1955 | Musick | 312/320 |
| 4,182,538 | 1/1980 | Armistead | 211/41 |

*Primary Examiner*—Joseph Man-Fu Moy
*Assistant Examiner*—David Fidei

*Attorney, Agent, or Firm*—Robert F. Delbridge; Arne I. Fors

[57] ABSTRACT

A container for thin, flat articles has a box-like housing with an opening through which each article can be inserted into the housing and removed therefrom in a direction lying in the plane of the article, and a series of article support members within the housing in side-by-side parallel relationship to enable each article to be received between a respective adjacent pair of support members. One of the support members is a primary support member having a handle to enable the primary support member to be at least partially pulled out of the container through the opening, and the other support members are secondary support members. Each adjacent pair of support members are interconnected to cause manual pulling of the primary support member at least partially out of the container through the opening to successively pull the secondary support members at least partially out of the container through the opening in a telescopic manner by successive operation of the interconnections after each successive support member has been pulled a predetermined distance. Each support member supports an article so that each article is at least partially pulled out of the container through the opening with its associated support member, thereby displaying the articles in staggered relationship.

8 Claims, 15 Drawing Figures

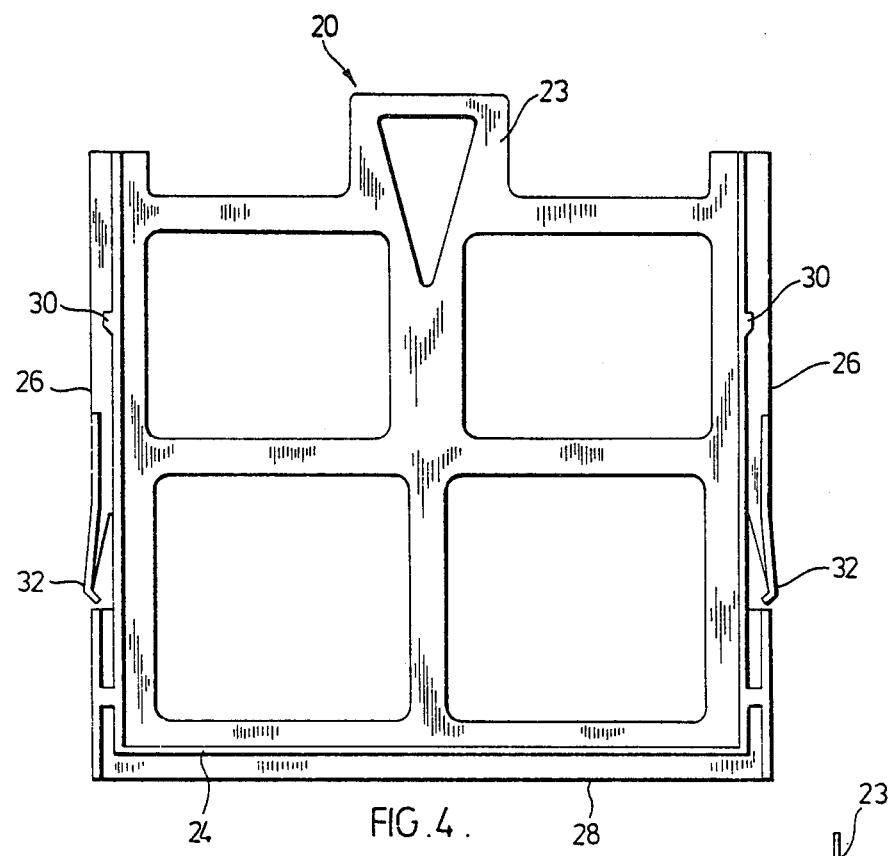
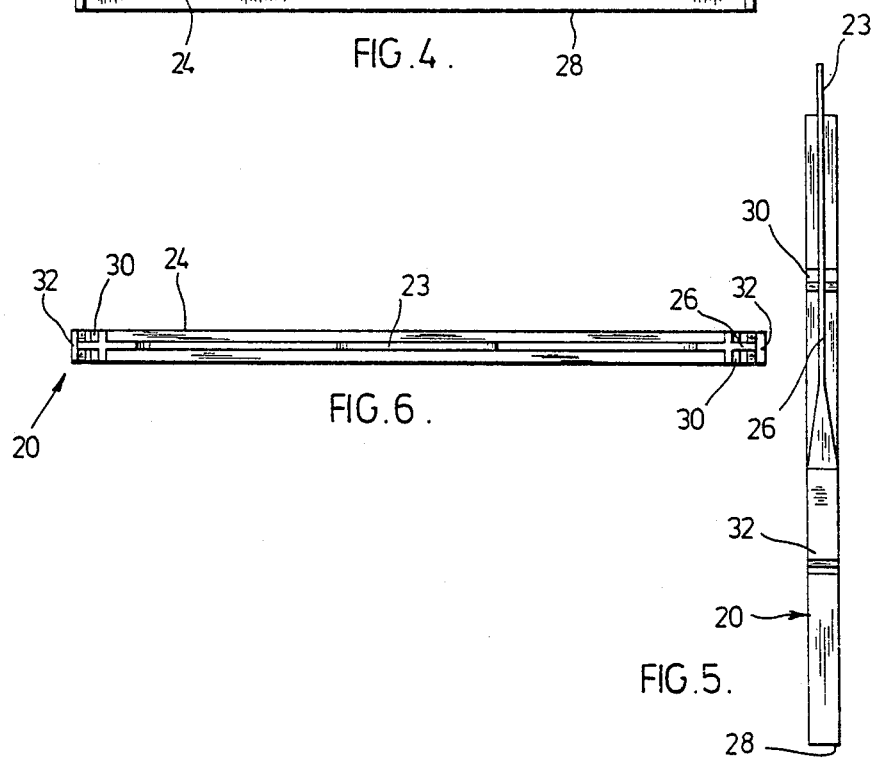

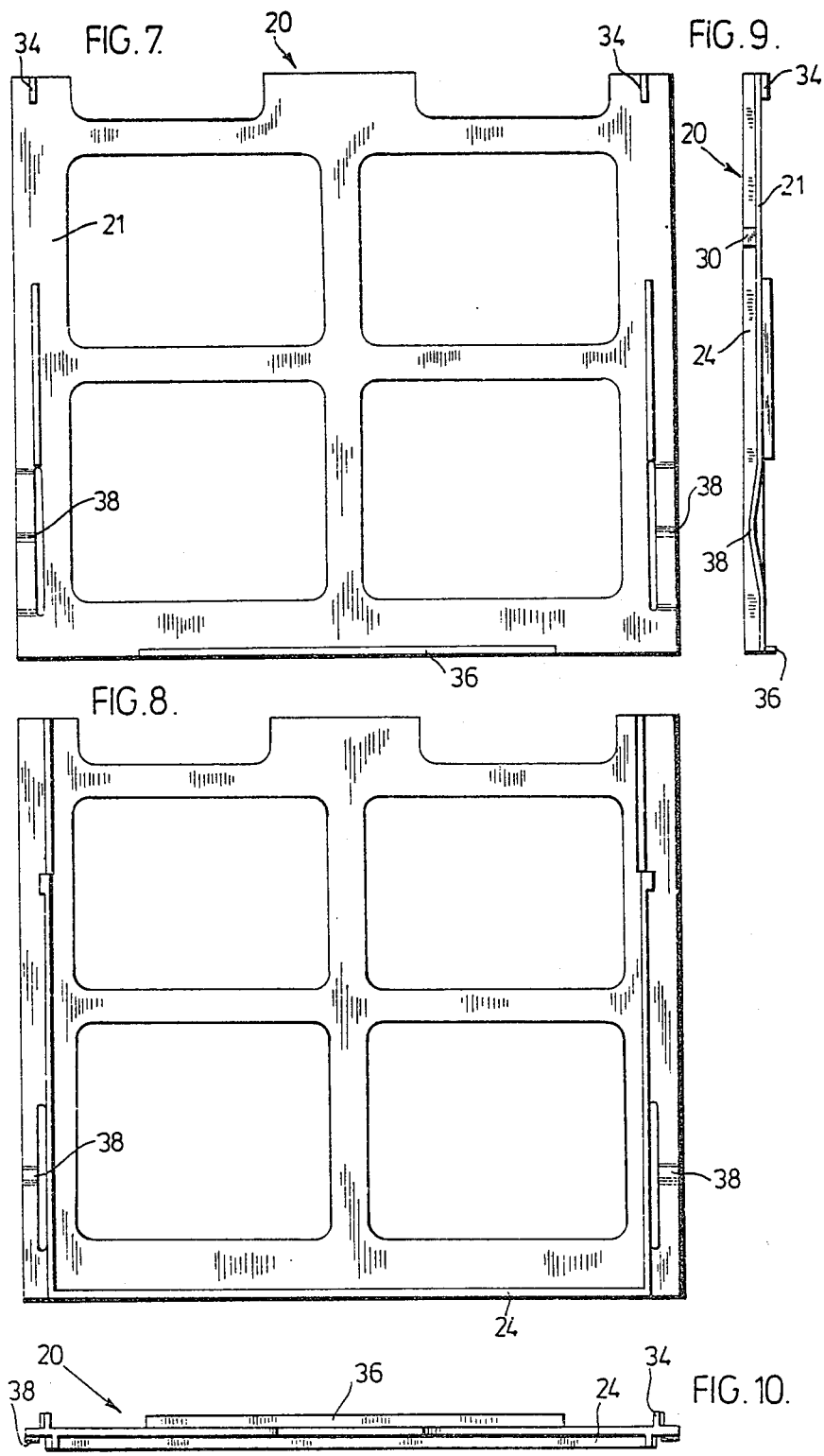

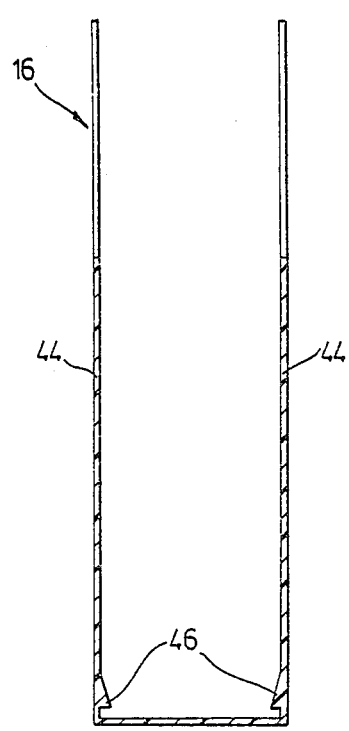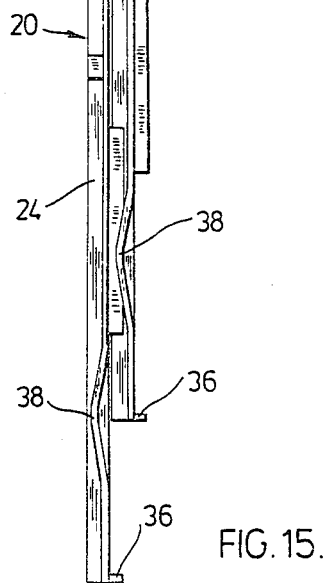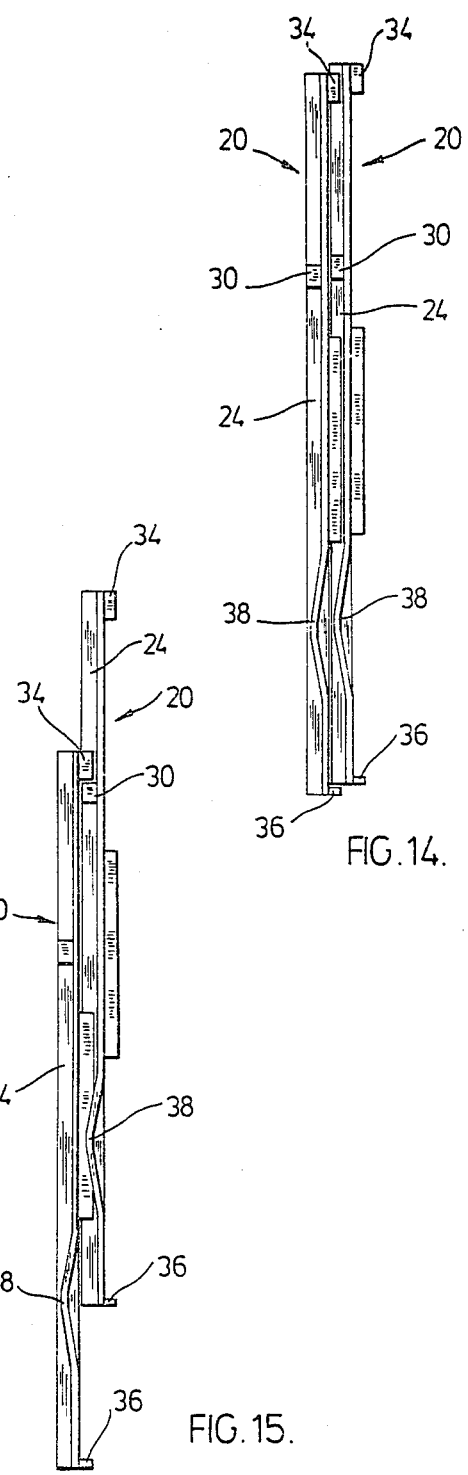
FIG. 13.
FIG. 15.
FIG. 14.

CONTAINER FOR THIN FLAT ARTICLES

The present invention relates to containers for thin, flat articles, for example the so-called "floppy discs" which are used in word processing machines and on which information can be stored magnetically. Alternatively, the articles may be gramophone records.

It is an object of the invention to provide a container for such articles which not only enables the articles to be satisfactorily stored but which also enables the articles to be readily viewable and removable when desired.

According to the present invention, a container for thin, flat articles comprises a box-like housing having an opening through which each article can be inserted into the housing and removed therefrom in a direction lying in the plane of the article, and a series of article support members within the housing in side-by-side parallel relationship to enable each article to be received between a respective adjacent pair of support members, one of the support members being a primary support member having manually grippable means to enable the primary support member to be at least partially pulled out of the container through the opening, the other support members being secondary support members, means interconnecting each adjacent pair of support members to cause manual pulling of the primary support member at least partially out of the container through the opening to successively pull the secondary support members at least partially out of the container through the opening in a telescopic manner by successive operation of respective interconnecting means after each successive support member has been pulled a predetermined distance, and each support member having article support means to cause each article to be at least partially pulled out of the container through the opening with its associated support member thereby displaying the articles in staggered relationship.

Articles can be very satisfactorily stored and conveyed from place to place in such containers, and the articles can readily be displayed for viewing and removal by pulling out the primary support member, with consequent pulling out of the secondary support members.

The support members may each have abutment means which co-operate after movement of a support member through said predetermined distance to provide said interconnecting means.

The housing may have internal grooves extending inwardly from the opening with at least some of the support members having side edges slidably received in said grooves. Portions of the side edges may project into frictional engagement with said grooves to assist in retaining the support members in a pulled-out position.

The secondary support members may have retracting means engageable by an adjacent support member moving from a pulled-out position into the container to enable the support members to be retracted into the housing by pushing the primary support member into the housing.

The primary support member may have releasable locking means engageable with the housing when the support members are in a fully pulled-out position to prevent return of the support members into the housing.

Each interconnecting means may comprise flexible connecting means which become taut after movement of a respective support member by said predetermined distance.

The support member may comprise a primary support member and a series of secondary support members on each side thereof.

A last secondary support member may be releasably secured within the housing and remain stationary when the primary and secondary support members are pulled at least partially out of the container.

Figure 2:
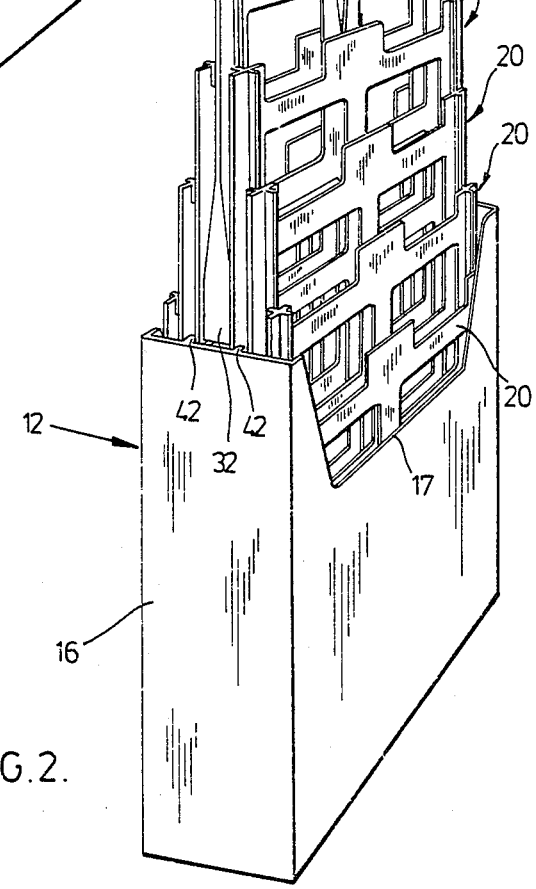
Figure 3:
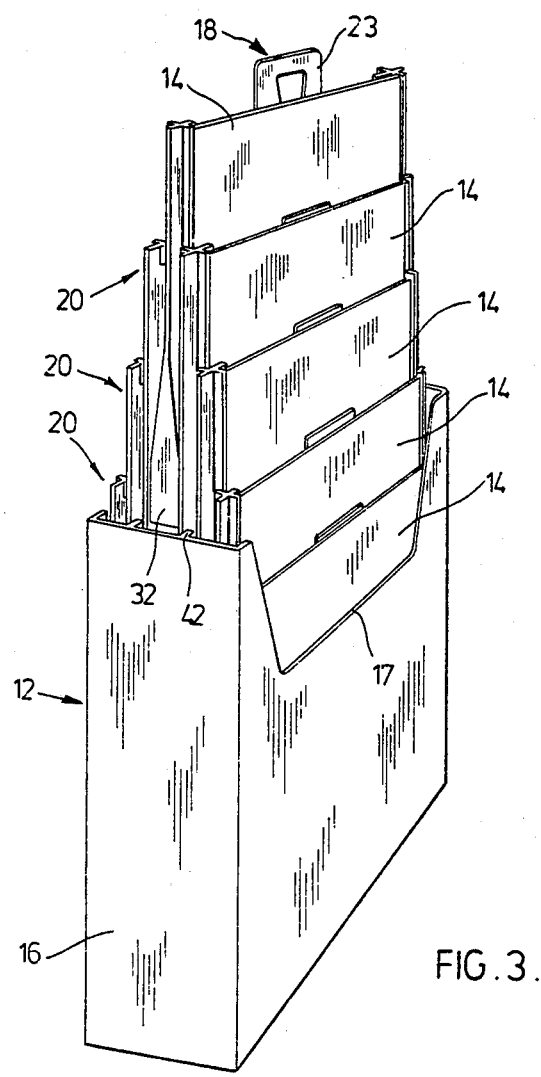
Figure 12:
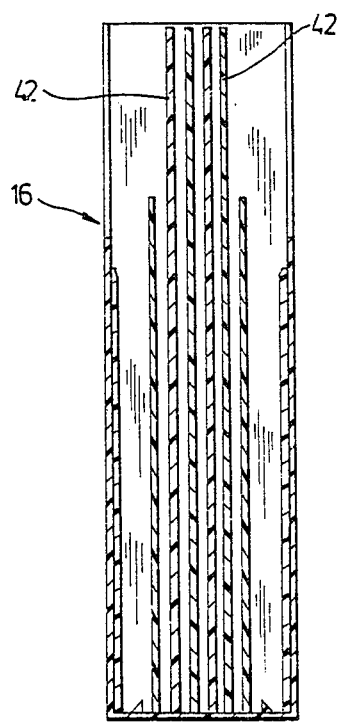
Figure 11:
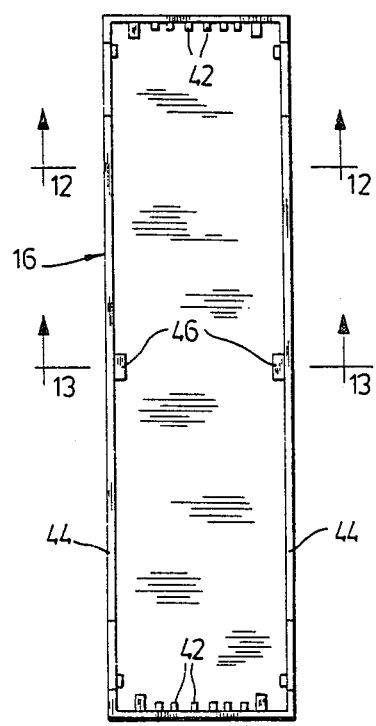

An embodiment of the invention will now be described, by way of example, with reference to the accompanying drawings, of which:

FIG. 1 is a perspective view of the container with the support members in the retracted position, FIG. 2 is a similar view showing the support members in the fully pulled-out position, FIG. 3 is a similar view showing articles positioned in the container, FIG. 4 is a front view of the primary support member, FIG. 5 is a side view thereof, FIG. 6 is a plan view thereof, FIG. 7 is a front view of a secondary support member, FIG. 8 is a rear view thereof, FIG. 9 is a side view thereof, FIG. 10 is a plan view thereof, FIG. 11 is a plan view of the housing, FIG. 12 is a sectional view of the housing along the line 12—12 of FIG. 11 showing the internal grooves in one side wall, FIG. 13 is a sectional view of the housing along the line 13—13 of FIG. 11 showing the retaining means for the stationary support members, FIG. 14 is a side view showing two secondary support members in the retracted position, and FIG. 15 is a similar view showing the two secondary side members in the pulled-out position, with an article in place on one of the secondary support members.

Referring to the accompanying drawings, a container 12 is provided for storing thin, flat square articles 14, for example the so-called "floppy discs" which are used in word processing machines and on which information can be stored magnetically, the actual disc being contained in a square envelope. The container 12 comprises a rectangular box-like housing 16 which is open at the top and whose front and rear walls have downwardly recessed upper edges 17. The container 12 also comprises a series of article support members in side-by-side relationship, there being a primary support member 18 and a series of secondary support members 20 on each side thereof. The housing may of course be provided with a suitable lid if desired.

The primary support member 18 has a flat rectangular body 22 with a handle 23 at the top. On each face of the body 22, a frame 24 extends adjacent to but inwardly spaced from the side edges 26 and bottom edge 28. The portion of the frame 24 extending along the bottom edge 28 acts as a support for the bottom of an article 14. The primary support member 18 also has an abutment 30 on the outer side of each side portion of the frame 24 spaced a predetermined distance below the top thereof, and the lower portion of each side edge 26 is widened and has an integral resilient locking member 32 projecting laterally outwardly of the side edge.

Each secondary support member 20 has a body 21 similar in size and shape to the body 22 of the primary support member, but has a frame 24 only on one face thereof, namely the face which is remote from the primary support member 18, with the frame 24 being provided with abutments 30 spaced a predetermined distance below the top. Each secondary support member 20 also has a pair of abutments 34 on the opposite side of the member to the abutments 30, the abutments 34 being located at the top of the member and vertically aligned with the abutments 30. Each secondary support member 20 also has a horizontal ledge 36 at the bottom on the same side as the abutments 34, and each side edge has a portion 38 bowed out of the plane of the member for a reason which will be described later.

Each internal side wall 40 of the housing 16 has four parallel inwardly-projecting ribs 42 extending from top to bottom thereof, and the interior front and back walls 44 have a central retaining member 46 adjacent to but slidably spaced from the bottom thereof.

When assembled with the housing 16, the primary support member 18 is located centrally therein with its widened side edge portion 27 slidably engaging the two inner ribs 42. Four secondary support members 20 are located on each side of the primary support member 18, with their horizontal ledges 36 facing the primary support member 18. The bottom part of the frame 24 of each support member 18, 20 overlies the ledge 36 of the adjacent support member 20. The side edges of the secondary support members 20 immediately adjacent the primary support member 18 are located between and are guided by the respective outer pairs of ribs 42 of the housing 16. The bottom part of the frame 24 of each last secondary support member 20 remote from the primary support member 18 is releasably engaged under the respective retaining member 46 on the housing 16. An article 14 is housed between each adjacent pair of support members 18, 20.

To display the articles, the primary support member 81 is pulled upwardly by the handle 23. When the primary support member 18 has been raised a predetermined distance, its abutments 30 engage the abutments 34 on the adjacent secondary support members 20 on opposite sides thereof, thereby pulling them upwardly. Similarly, when these secondary support members 20 have been pulled upwardly by the predetermined distance, the abutments 30 engage the abutments 34 on the next adjacent pair of secondary support members 20, thereby pulling them upwardly. Thus, the primary support member 18 and the respective pairs of secondary support members 20 are successively pulled upwardly until the abutments 30 on the next to last secondary support member 20 engage the abutments 34 on the last secondary support member 20. The last secondary support members 20 do not move because they are retained by the retaining members 46 on housing 16. The bowed portions 38 on the side edges of the secondary support members 20 sliding between the ribs 42 engage the ribs 42 to provide some frictional engagement therebetween.

When the support members 18 20, have been fully extended as described above, the locking members 32 on the primary support member 18 snap outwardly over the upper ends of the two inner ribs 42 to retain the support members 18, 20 in the pulled-out position. The articles move upwardly with the respective support members 18, 20, since they are seated on the lower portions of the frame 24. The articles 14 are thus then displayed in staggered relationship, and are readily viewed and removable.

To retract the support members 18, 20, the primary support member 18 is pushed downwardly by manual pressure on the handle 23 to force the locking members 32 laterally inwardly of the tops of the ribs 42 so that the primary support member 18 moves into the housing 16. After travelling downwardly a predetermined distance, the lower part of the frame 24 engages the ledges 36 on the adjacent pair of secondary support members 20 so that continued downward movement of the primary support member 18 also pushes these secondary support members 20 downwardly. Similarly, the ledges 36 of the next pair of secondary support members 20 are subsequently engaged by the lower portions of the frames 24 of the respective secondary support members 20 until the support members 18, 20 are fully returned into the housing 16.

The housing 16 and support members 18, 20 may be made of any convenient material, for example synthetic plastic material.

It will be appreciated that the abutments 30,34 may in fact be parts of pin and slot connections between the respective support members.

In another embodiment of the invention, the abutments are replaced by flexible connecting members secured to respective pairs of support members 18, 20, with each flexible connecting member becoming taut after the respective adjacent support member has been pulled upwardly the predetermined distance so as to achieve the same manner of operation as the illustrated embodiment.

Other embodiments of the invention will be readily apparent to a person skilled in the art, the scope of the invention being defined in the appended claims.

What we claim is:

1. A container for thin, flat articles comprising a box-like housing having an opening through which each article can be inserted into the housing and removed therefrom in a direction lying in the plane of the article, and a series of article support members within the housing in side-by-side parallel relationship to enable each article to be received between a respective adjacent pair of support members, the housing having internal grooves extending inwardly from the opening and at least some of the support members having side edges slidably received in said grooves, one of the support members being a primary support member having manually grippable means to enable the primary support member to be at least partially pulled out of the container through the opening, the other support members being secondary support members, means interconnecting each adjacent pair of support members to cause manual pulling of the primary support member at least partially out of the container through the opening to successively pull the secondary support members at least partially out of the container through the opening in a telescopic manner by successive operation of respective interconnecting means after each successive support member has been pulled a predetermined distance, and each support member having article support means to cause each article to be at least partially pulled out of the container through the opening with its associated support member thereby displaying the articles in staggered relationship.

2. A container according to claim 1 wherein the support members each have abutment means which cooperate after movement of a support member through said predetermined distance to provide said interconnecting means.

3. A container according to claim 1 wherein portions of said side edges project into frictional engagement with said grooves to assist in retaining the support members in a pulled-out position.

4. A container according to claim 1 wherein the secondary support members have retracting means engageable by an adjacent support member moving from a pulled-out position into the container to enable the support members to be retracted into the housing by pushing the primary support member into the housing.

5. A container according to claim 1 wherein the primary support member has releasable locking means engageable with the housing when the support members are in a fully pulled-out position to prevent return of the support members into the housing.

6. A container according to claim 1 wherein each interconnecting means comprises flexible connecting means which become taut after movement of a respective support member by said predetermined distance.

7. A container according to claim 1 wherein the support members comprise a primary support member and a series of secondary support members on each side thereof.

8. A container according to claim 1 wherein a last secondary support member is releasably secured within the housing and remains stationary when the primary and secondary support members are pulled at least partially out of the container.

* * * * *